United States Patent [19]

Aldridge et al.

[11] Patent Number: 5,338,717
[45] Date of Patent: * Aug. 16, 1994

[54] METHOD FOR THE PREPARATION OF SUPPORTED HYDROGENATION AND HYDROTREATING CATALYSTS

[75] Inventors: Clyde L. Aldridge; Kenneth L. Riley, both of Baton Rouge, La.

[73] Assignee: Exxon Research and Engineering Company, Florham Park, N.J.

[*] Notice: The portion of the term of this patent subsequent to Nov. 17, 2009 has been disclaimed.

[21] Appl. No.: 141,839

[22] Filed: Oct. 22, 1993

Related U.S. Application Data

[63] Continuation-in-part of Ser. No. 30,751, Mar. 11, 1993, which is a continuation-in-part of Ser. No. 632,723, Dec. 24, 1990, Pat. No. 5,198,100.

[51] Int. Cl.$^5$ .................. B01J 37/02; B01J 37/16; B01J 37/20; B01J 27/19
[52] U.S. Cl. .................. 502/211; 502/219; 502/220; 502/151; 502/170; 502/174; 502/210
[58] Field of Search .............. 208/216 R, 217, 254 H, 208/89; 502/219, 220, 151, 170, 174, 210, 211, 219, 220

[56] References Cited

U.S. PATENT DOCUMENTS

| | | | |
|---|---|---|---|
| 3,961,036 | 6/1976 | Hamner et al. | 502/231 X |
| 4,016,106 | 4/1977 | Sawyer et al. | 502/254 |
| 4,352,729 | 10/1982 | Jacquin et al. | 502/313 X |
| 4,540,589 | 3/1985 | Ryan | 502/66 |
| 4,648,963 | 3/1987 | Kutes et al. | 208/254 H X |
| 4,655,905 | 4/1987 | Plumail et al. | 208/254 H X |
| 4,740,295 | 4/1988 | Bearden et al. | 208/254 H X |
| 4,886,582 | 12/1989 | Simpson | 502/211 |
| 4,960,506 | 10/1990 | Halbert et al. | 208/254 H X |
| 4,965,236 | 10/1990 | Roberts | 502/211 |
| 4,990,243 | 2/1991 | Winslow et al. | 502/257 X |
| 5,164,354 | 11/1992 | Aldridge et al. | 502/220 |

OTHER PUBLICATIONS

Kirk-Othmer, *Encyclopedia of Chemical Technology*, 3rd ed., John Wiley & Sons, vol. 17, p. 636, 1982.

*Primary Examiner*—Paul Lieberman
*Assistant Examiner*—Douglas McGinty
*Attorney, Agent, or Firm*—Henry E. Naylor

[57] ABSTRACT

The present invention relates to the preparation of catalysts for heteroatom removal, particularly sulfur, from petroleum and synthetic fuel feedstocks. The catalyst is comprised of at least one Group VIII metal, and at least one Group VI metal, on a refractory support. The catalyst is prepared by: impregnating an inorganic oxide support material with a Group VI heteropolyacid; treating said impregnated support with an aqueous solution of a reducing agent which is capable of at least partially reducing the Group VI metal of the heteropolyacid; drying said treated support at a temperature from about 20° C. to about 200° C. at about atmospheric pressure; impregnating the treated support with a Group VIII metal salt of an acid having an acidity less than that of the Group VI heteropolyacid; drying said impregnated treated support at a temperature from about 20° C. to about 200° C. at about atmospheric pressure; and sulfiding said impregnated support, thereby forming the catalysts.

28 Claims, No Drawings

METHOD FOR THE PREPARATION OF SUPPORTED HYDROGENATION AND HYDROTREATING CATALYSTS

CROSS-REFERENCE TO RELATED APPLICATIONS

This is a continuation-in-part application of U.S. Ser. No. 08/030,751 filed Mar. 11, 1993, allowed, which is a continuation-in-part application of U.S. Ser. No. 632,723 filed Dec. 24, 1990, now U.S. Pat. No. 5,198,100.

FIELD OF THE INVENTION

The present invention relates to the preparation of catalysts for heteroatom removal, particularly sulfur, from petroleum and synthetic fuel feedstocks. The catalyst is comprised of at least one Group VIII metal, and at least one Group VI metal, on a refractory support.

BACKGROUND OF THE INVENTION

Hydrotreating of petroleum feedstocks and various boiling fractions thereof has become increasingly important because of more stringent product quality requirements. For example, governmental regulations concerning allowed limits of sulfur in petroleum products, such as diesel fuel, become more limiting each year. Furthermore, the petroleum industry foresees the time when it will have to turn to relatively high boiling feeds derived from such materials as coal, tar sands, oil-shale, and heavy crudes. Feeds derived from such materials generally contain significantly more deleterious components, such as sulfur, nitrogen, oxygen, halides, and metals. Consequently, such feeds require a considerable amount of upgrading in order to reduce the content of such components, thereby making them more suitable for further processing, such as fluid catalytic cracking, catalytic reforming, etc.

Hydrotreating of hydrocarbonaceous feeds is well known in the art and usually requires treating the feed with hydrogen in the presence of a supported catalyst at hydrotreating conditions. The catalyst is typically comprised of a Group VI metal with one or more Group VIII metals as promoters on a refractory support. Hydrotreating catalysts which are particularly suitable for hydrodesulfurization or hydrodenitrogenation generally contain molybdenum or tungsten on alumina promoted with a metal such as cobalt, nickel, iron, or a combination thereof. Cobalt promoted molybdenum on alumina catalysts are most widely used for hydrodesulfurization, while nickel promoted molybdenum on alumina catalysts are the most widely used for hydrodenitrogenation.

Further, "Novel Hydrotreating Catalysts Prepared From Heteropolyanion Complexes Impregnated on Alumina", by A. M. Maitra and N. W. Cant, *Applied Catalysis*, 48 (1989) pp. 187–197, teaches hydrotreating catalysts prepared by impregnating alumina with solutions of heteropolyanions having the general structure $[H_wA_xB_yO_z]^{n-}$, where A may be Co or Ni, and B may be Mo or W. This reference also shows that these catalysts were tested for hydrodesulfurization and hydrodenitrogenation activity and were found to have no significant advantage over standard commercial hydrotreating catalysts.

While catalysts containing molybdenum with nickel, cobalt, or both, are in extensive commercial use today, they have limitations with respect to removing heteroatoms from heavy feeds, such as heavy coker gas oils and coal derived gas oils. As the feeds become heavier, the content of condensed aromatic hydrocarbons, with and without heteroatoms, increases. These condensed aromatics can absorb strongly on the catalyst sites reducing both the rate and extent of heteroatom removal. Consequently, there exists a need in the art for improved hydrotreating catalysts having increased activity toward such heavy feeds, particularly when the heteroatom to be removed is sulfur or nitrogen.

SUMMARY OF THE INVENTION

In accordance with the present invention, there is provided a method for preparing a catalyst composition, which method comprises:
(a) impregnating an inorganic oxide support material with a Group VI heteropolyacid;
(b) treating said impregnated support with an aqueous solution of a reducing agent which is capable of at least partially reducing the Group VI metal of the heteropolyacid;
(c) drying said treated support at a temperature from about 20° C. to about 200° C. at about atmospheric pressure;
(d) impregnating the treated support with a Group VIII metal salt of an acid having an acidity less than that of the Group VI heteropolyacid;
(e) drying said impregnated treated support at a temperature from about 20° C. to about 200° C. at about atmospheric pressure; and
(f) sulfiding said impregnated support, thereby forming the catalysts.

Also, in accordance with the present invention, the catalyst is prepared by:
(a) impregnating an inorganic oxide support with a Group VI heteropolyacid and a Group VIII metal salt of an acid having an acidity less than that of the Group VI heteropolyacid;
(b) drying said impregnated support at a temperature from about 20° C. to about 200° C. and at atmospheric pressure;
(c) treating said dried support with an aqueous solution of a reducing agent which is capable of at least partially reducing the Group VI metal of the hetropoly acid;
(d) dry said treated support a temperature from about 20° C. to about 200° C. and at atmospheric pressure; and
(e) sulfiding said dried treated support, thereby forming the catalyst.

In a preferred embodiment of the present invention, the reducing agent is selected from the group consisting of sulfur dioxide, hydrogen sulfide, hydrazine, sucrose, dextrose, stannous chloride, zinc, iron, and hydroquinone.

In another preferred embodiment of the present invention, the salt of the Group VIII metal is selected from acetates, formates, citrates, oxides, hydroxides, and carbonates.

In yet another preferred embodiment of the present invention, the salt of the Group VIII metal is a citrate and the heteropolyacid is a phosphomolybdic or phosphotungstic acid and the support is alumina.

DETAILED DESCRIPTION OF INVENTION

A variety of feedstocks can be hydrotreated with the catalysts of the present invention, including hydrocarbonaceous fractions and whole feeds. Non-limiting examples of such feeds include organic solvents, light, middle and heavy petroleum distillates, as well as petroleum residual feeds. Other feedstocks include coal derived liquids, shale oil, and heavy oils derived from tar sands.

In the practice of the present invention, a heteroatom containing feed, especially a sulfur and/or nitrogen containing feed, is contacted with hydrogen at hydrotreating conditions in the presence of a catalyst of the present invention. The catalyst is comprised of at least one Group VIII metal, preferably Co and/or Ni, more preferably Co; and at least one Group VI metal, preferably Mo an W, more preferably Mo, on an inorganic oxide support, preferably alumina. The Group VIII metal is present in an amount ranging from about 2 to 20 wt. %, preferably from about 4 to 12 wt. %. Preferred Group VIII metals include Co, Ni, and Fe, with Co being most preferred. The preferred Group VI metal is Mo which is present in an amount ranging from about 5 to 50 wt. %, preferably from about 10 to 40 wt. %, and more preferably from about 20 to 30 wt. %. All metals weight percents are on dry support. By "on dry support" we mean that the percents are based on the weight of the support substantially dry. For example, if the support were to weight 100 g., then 20 wt. % Group VIII metal would mean that 20 g. of Group VIII metal was on the support.

It is critical to the present invention that the Group VIII metal be incorporated into the support material by use of a Group VIII metal salt of an acid which has an acidity less than that of the Group VI heteropolyacid. If the acidity of the acid comprising the salt of the Group VIII metal is not less than the acidity of the heteropolyacid a catalyst complex will not form. Non-limiting examples of Group VIII metal salts of conjugate acids which are suitable for use herein includes acetates, formates, citrates, oxides, hydroxides, carbonates, and the like. Preferred are water soluble salts, more preferred are the water soluble citrates, acetates, and formates, and most preferred are the citrates.

The Group VI metal is incorporated into the support by use of a heteropolyacid. An suitable heteropolyacid may be used in the practice of the present invention, with the water soluble acids being preferred. A detailed description of heteropolyacids can be found in *Topics in Current Chemistry* 76, "Heteropoly Compounds of Molybdenum and Tungsten", By G. A. Tsigdinas, Springer-Verlag Berlin Heidelberg, 1978, which is incorporated herein by reference. Preferred are water soluble heteropolyacids, such as phosphomolybdic acid, phosphotungstic acid, silicomolybdic acid, and silicotungstic acid. Heteropolyacids soluble in organic solvents for catalyst impregnation may also be used. Non-limiting examples of such organic solvents include alcohols, such as the $C_1$-$C_8$ aliphatic alcohols, preferably methanol.

Any suitable inorganic oxide support material may be used for the catalysts of the present invention. Preferred are alumina, silica and silica-alumina. More preferred is alumina. Other refractory inorganic compounds may also be used, non-limiting examples of which include zirconia, titania, magnesia, and the like. The alumina can be any of the aluminas conventionally used for hydrotreating catalysts. Such aluminas are generally porous amorphous alumina having an average pore size from about 50 to 600 Å, and a surface area from about 50 to about 450 m$^2$/g, preferably from about 100 to 300 m$^2$/g.

As stated above, alumina and co-gelled alumina-silica supports are preferred. It is preferred that the support material of the present invention be surface modified with silica. It is also preferred that when the support is a co-gelled alumina-silica material that is not contain more than about 35 wt. % silica.

The silica surface modifying agent is added to the support prior to incorporation of the catalytic metals. Any suitable silicon containing compound can be used as the source of silica. For example, preferred silica sources include tetraethylorthosilicate in a suitable organic solvent, such as a $C_1$-$C_8$ alcohol, preferably isopropyl alcohol. However, such sources as silanes, colloidal silica, silicon chlorides, sodium silicate, or other organic silicon salts, may also be used. Following impregnation with silica source, the catalyst support is dried at temperatures up to about 200° C. and calcined. Calcination is effective in converting a silicon containing source to silica incorporated on the surface.

The amount of silica used to modify the surface of the support will be at least an effective amount. That is at least that amount which will enhance the activity of the catalyst for heteroatom removal, preferably at least that amount which will enhance the activity by at least about 5%, more preferably by at least about 10%. This amount of silica will generally be at least about 0.5 wt. %, preferably at least about 1 wt. %. More preferably, silica additions should range from about 1 to 25 wt. %, most preferably from about 2 to 12 wt. %.

The catalysts are prepared in accordance with the present invention by the following methods, both of which avoid the need for vacuum drying. One preferred method is to first impregnate the Group VI heteropolyacid onto the support. This is followed by treating the impregnated support with an aqueous solution of a reducing agent which is capable of at least partially reducing the molybdenum of the heteropolyacid. That is, an effective amount of reducing agent is used which amount will cause at least a partial reduction of the Group VI metal. This amount will typically be a 5 to 50% solution, preferably a 15 to 25% solution. The impregnated support is treated with the reducing agent at about atmospheric pressure and at a temperature from about 20° C. to 100° C.

The impregnated treated support is then impregnated with a Group VIII metal salt of an acid having an acidity less than (pKa greater than) that of the Group VI heteropolyacid. The so impregnated support is then dried at about atmospheric pressure and a temperature from about 20° C. to 200° C.; and sulfided to form the final catalyst.

Another preferred method is to impregnate the support with both the Group VIII metal salt and the Group VI heteropolyacid, followed by drying under the aforementioned conditions (20° to 200° C.). The impregnated dried support is then treated with the reducing agent as indicated above, again dried, and sulfided to form the final catalyst.

Non-limiting examples of reducing agents suitable for use in the present process include: sulfur dioxide, hydrogen sulfide, hydrazine, sucrose, dextrose, stannous chloride, and hydroquinone. Preferred are hydrazine and hydroquinone, More preferred is hydroquinone. Conditions at which the impregnated support is treated with reducing agent are temperatures from about 20° C. to 100° C. at substantially atmospheric pressures.

The Group VI and Group VIII metals can be incorporated into the support using any suitable technique, preferably by an incipient wetness technique, which is well know in the art. While it is preferred that a solution containing all of the metal salts be prepared and used to impregnate the support material in one or more impregnations, it is understood that each metal can be individually impregnated into the support in any order. For example, a solution of Group VIII salt of an acid can be used to impregnate the Group VIII metal into the support. The so impregnated support can then be dried and impregnated with Group VI heteropolyacid. For economical purposes, it is preferred that one solution be used to impregnate all of the desired metals into the support simultaneously. Any suitable impregnation conditions may be used for the preparation of the catalysts of the present invention. Generally, such conditions will include treating the support material with the impregnation solution for an effective period of time, and at an effective temperature. By effective period of time we mean for at least that amount of time in which substantially all of the metal that will be impregnated into the support will be impregnated. Generally, this amount of time will range from about 1 minute to about 48 hours, preferably from about 10 minutes to about 30 hours. An effective temperature will generally be from about 15° C. to about 100° C., preferably from about 20° C. to about 75° C.

Prior to use, the catalyst is sulfided under conventional sulfiding conditions. This sulfiding may be accomplished in situ, namely in the reactor. For example, the catalyst can be brought into contact with a sulfur-containing distillate in the presence of about 50 to 1,500 V/H/V of a hydrogen-containing gas under conditions including a temperature of about 75° C. to 450° C., a pressure (total pressure) of about 10 to 2500 psig, and a liquid hourly space velocity of about 0.3 to 2.0 V/H/V. After this sulfiding treatment, the sulfur-containing distillate is switched over to the feedstock to be treated, and the operation is restarted under operation conditions suitable for hydrotreating of the feedstock. In addition to the above process, use may be made of a process for effecting sulfiding comprising either bringing the catalyst into direct contact with hydrogen sulfide or other sulfur compounds, or by adding the sulfur compound to a suitable distillate and bringing the resulting distillate into contact with the catalyst. Suitable sulfur compounds, or sulfiding agents, which may be in the sulfur containing distillate include dimethyl disulfide, butyl mercaptan, dimethyl mercaptan, carbon disulfide, and the like.

Heteroatom removal conditions, especially hydrodesulfurization and hydrodenitrogenation conditions, will vary considerably depending on such things as the nature of the feed being treated, the nature of the nitrogen or sulfur being remove, the nature of the complexes being removed, the nature of the complexes employed, and the extent of boiling point conversion, if any, desired. Table I below sets forth typical conditions for hydrodesulfurization/hydrodenitrogenation of a naphtha boiling within a range of about 25° C. to about 210° C., a diesel fuel boiling within a range from about 170° C. to 350° C., a heavy gas oil boiling within a range of from about 325° C. to about 475° C., a lube oil feed boiling within a range of from about 290° C. to 500° C., or residuum containing from about 10 percent to about 50 wt. % of material boiling above about 575° C. The catalysts of the present invention are not only superior for the hydrotreating of heteroatom-containing feedstocks, but they may also be used for the saturation of aromatic compounds.

TABLE I

| Feed | Temp., °C. | Pressure psig | Space Velocity V/V/Hr. | Hydrogen Gas Rate SCF/B* |
|---|---|---|---|---|
| Naphtha | 100–370 | 50–800 | 0.5–10 | 100–4000 |
| Diesel | 200–400 | 100–1500 | 0.4–6 | 200–6000 |
| Heavy | 260–430 | 250–2500 | 0.3–4 | 500–6000 |
| Lube Oil | 200–450 | 100–3000 | 0.2–5 | 100–10,000 |
| Residuum | 340–450 | 500–5000 | 0.1–2 | 1000–10,000 |

Example 1 (N.B. No. 18219, p. 127)

A solution of 28.62 g phosphomolybdic acid and 26.50 g deionized water was impregnated into 63.81 g of a high surface area alumina support containing 8.46% adsorbed moisture (58.41 g dry $Al_2O_3$). The form of the $Al_2O_3$ was 1/20" extrudate. This alumina support had a surface area of 171 $m^2/g$ and a pore volume of 0.7364 cc/g. The impregnated mixture was allowed to sit at room temperature for two hours, after which it was dried for two hours at atmospheric pressure in a Proctor and Schwartz forced air oven at 118° C. to a weight of 85.36 g.

A solution was made of 5.34 g of MCB hydroquinone and 30.24 g of deionized water at 60° C. The above dried solid was heated to 49° C. and poured into the warm solution and the mixture shaken. The impregnated mixture was allowed to stand one hour at room temperature then dried for two hours in the Proctor and Schwartz oven at 119° C. to a weight of 89.50 g.

A solution was made by heating 7.339 g of Strem Chemical Co. $CoCO_3$, and 12.96 g of Mallinckrodt citric acid diluted to 39.45 g with deionized water. After the solution was cooled, the above 89.50 of dried solid was added and the mixture shaken and allowed to stand at room temperature for two hours, after which it was dried in the Proctor and Schwartz oven at 119° C. for four hours to yield 104.85 g of finished catalyst.

This catalyst was sulfided and tested at 300 psig according to the procedure of U.S. Pat. No. 5,164,354 and found to have 162% of the HDS activity of Akzo TN-8 or 191% of the HDS activity of Criterion HDS-22 commercial catalysts.

Example 2 (93AF-032, N.B. No. 18487, p. 20)

A solution was made by warming 8.07 g Strem Chemical Company $CoCO_3$, 14.26 g of Mallinckrodt citric acid and 31.48 g of Fisher phosphomolybdic acid diluted to 73.43 g with deionized water. This solution was impregnated onto 65.70 g of a high surface area alumina support as 1/20" extrudate (SA 171 $m^2/g$, PV 0.7364 cc/g) containing 2.21% adsorbed water (64.25 g of dry $Al_2O_3$), allowed to stand at room temperature overnight and then dried in a Proctor and Schwartz oven at 119° C. to 112.14 g.

This 112.14 g. of dried solids at room temperature was added to a 55° C. solution of 4.19 g of MCB hydroquinone diluted to 34.71 g with deionized water. The mixture was allowed to stand at room temperature overnight and then dried for two hours in a Proctor and Schwartz oven at 120° C. to yield 114.28 g of finished catalyst.

This catalyst was sulfided and tested at 300 psig according to the procedure of U.S. Pat. No. 5,164,354 and found to have 184% of the activity of Akzo TN-8 or 216% of the activity of Criterion HDS-22 commercial catalysts.

Example 3 (93AF-031, N.B. No. 18487, p. 18)

A solution was made of 8.07 g Strem Chemical Co. $CoCO_3$, 14.26 g of Mallinckrodt citric acid and 31.48 g of Fisher phosphomolybdic acid in warm deionized water and diluted to 73.43 g with deionized water.

This solution was impregnated onto 65.70 g of a high surface area alumina support as 1/20" extrudate (surface area 171 m²/g, PV 0.7.364 cc/g) containing 2.21% adsorbed water (64.25 of dry $Al_2O_3$). The mixture was allowed to stand at room temperature overnight and dried in a Proctor and Schwartz oven at 120° C. to an impregnated solids wt. of 115.66 g.

This 115.66 g of solids was warmed to 76° C. and added to a 55° C. solution of 4.19 g of MCB hydroquinone diluted to 31.19 g with deionized water. The mixture was allowed to stand at room temperature overnight and then dried for two hours in a Proctor and a Schwartz oven at 120° C. to yield 113.61 g of finished catalyst.

This catalyst was sulfided and tested at 300 psig according to the procedure of U.S. Pat. No. 5,164,354 and found to have 167% of the HDS activity of Akzo TN-8 or 196% of the HDS activity of Criterion HDS commercial catalysts.

Example 4 (N.B. No. 18487, p. 83)

A portion (51.63 g) of the finished catalyst of Example 3 was heated under a flow of nitrogen at 247° C. (477° F.) for two hours to yield 46.43 g of calcined catalyst.

This catalyst was sulfided and tested at 300 psig according to the procedure of U.S. Pat. No. 5,164,354 and found to have 156% of the HDS activity of Akzo TN-8 or 184% of the HDS activity of Criterion HDS-22 commercial catalysts.

Example 5 (93AF-036, N.B. No. 18487, p. 30)

A solution was made by warming 7.32 g Pfaltz and Bauer and Co, $NiCO_3$, 12.96 g of Mallinckrodt citric acid and 28.62 g of Fisher phosphomolybdic acid in deionized water and diluting to 66.75 g with deionized water.

This solution was impregnated onto 59.75 g of a high surface area alumina as 1/20" extrudate (S.A. 171 m²/g, P.V. 0.7364 cc/g) containing 2.24% adsorbed moisture (58.41 g dry $Al_2O_3$). After standing overnight at room temperature the mixture was dried in a Proctor and Schwartz oven at 119° C. and atmospheric pressure to 102.29 g.

The above 102.29 g of solid (at room temperature) was added to 31.21 g of aqueous solution (at 55° C.) containing 3.81 g of MCB hydroquinone, shaken and allowed to stand overnight. The mixture was then dried in a Proctor and Schwartz oven at 119° C. and atmospheric pressure for two hours to yield 104.81 g of finished catalyst.

The hydrodenitrogenation activity of this catalyst was determined at 300 psig on an aromatic lube extract feed under the sulfiding and test conditions of U.S. Pat. No. 5,164,354 and compared with results obtained with KF-840, a state of the art Ni/Mo hydrodenitrogenation catalyst marketed by Akzo. Results are compared in Table II and show that the catalyst of this invention possesses 138% of the HDN activity of KF-840.

TABLE II

| Feedstock: | Aromatic Lube Extract Sulfur 4.316%, Nitrogen 2.308% | |
|---|---|---|
| Test Conditions: | 650° F., 690 psig, 0.75 V/V/hr. 8400 SCF/bbl $H_2$ | |
| | KF 840 Run 586 | Catalyst of Example 5 Run 716 |
| Product Sulfur, % | 0.993 | 0.920 |
| HDS Activity | 100 | 114 |
| Product Nitrogen, % | 0.191 | 0.171 |
| HDN Activity | 100 | 138 |

What is claimed is:

1. A method for preparing a catalyst composition suitable for removing heteroatoms from a heteroatom-containing feedstock, which method comprises:
   (a) impregnating an inorganic oxide support material with a Group VI heteropolyacid;
   (b) treating said impregnated support with an aqueous solution of a reducing agent which is capable of at least partially reducing the Group VI metal of the heteropolyacid;
   (c) drying said treated support at a temperature from about 20° C. to about 200° C. at about atmospheric pressure;
   (d) impregnating the treated support with a Group VIII metal salt of an acid having an acidity less than that of the Group VI heteropolyacid;
   (e) drying said impregnated treated support at a temperature from about 20° C. to about 200° C. at about atmospheric pressure; and
   (f) sulfiding said impregnated support, thereby forming the catalyst.

2. The method of claim 1 wherein the reducing agent is selected from the group consisting of sulfur dioxide, hydrogen sulfide, hydrazine, sucrose, dextrose, stannous chloride, and hydroquinone.

3. The method of claim 2 wherein the reducing agent is selected from hydrazine and hydroquinone.

4. The method of claim 3 wherein the Group VIII metal is selected from Co and Ni and a mixture thereof, and the Group VI metal is selected from Mo and W.

5. The method of claim 4 wherein the acid comprising the salt of the Group VIII metal is selected from the group consisting of acetates, formates, citrates, oxides, hydroxides, and carbonates, and the heteropolyacid is selected from phosphomolybdic acid, phosphotungstic acid, silicomolybdic acid, and silicotungstic acid.

6. The method of claim 5 wherein the salt of the Group VIII metal is a citrate, and the heteropolyacid is selected from phosphomolybdic acid, phosphotungstic acid, silicomolybdic acid, and silicotungstic acid.

7. The method of claim 6 wherein the inorganic oxide support is selected from alumina, silica, and co-gelled alumina-silica.

8. The method of claim 7 wherein about 4 to 12 wt. % Group VIII metal and from about 10 to 40 wt. % Group VI metal are used, based on the support.

9. The method of claim 8 wherein prior to impregnation the inorganic oxide support is modified with silica.

10. The method of claim 9 wherein the silica source is tetraethylorthosilicate.

11. The method of claim 3 wherein the Group VIII metal is selected from Co and Ni and a mixture thereof, the Group VI metal is selected from Mo and W; the salt of the Group VIII metal is selected from the group consisting of acetates, formates, citrates, oxides, hydroxides, and carbonates; and the heteropolyacid is selected from phosphomolybdic acid, phosphotungstic acid, silicomolybdic acid, and silicotungstic acid.

12. The method of claim 11 wherein the salt of the Group VIII metal is a citrate and the heteropolyacid is phosphomolybdic acid.

13. The method of claim 12 wherein prior to impregnation the inorganic oxide support is modified with silica.

14. The method of claim 13 wherein the silica source is tetraethylorthosilicate.

15. A method for preparing a catalyst composition suitable for removing heteroatoms from a heteroatom-containing feedstock, which method comprises:
   (a) impregnating an inorganic oxide support with a Group VI heteropolyacid and a Group VIII metal salt of an acid having an acidity less than that of the Group VI heteropolyacid;
   (b) drying said impregnated support at a temperature from about 20° C. to about 200° C. and at about atmospheric pressure;
   (c) treating said dried support with an aqueous solution of a reducing agent which is capable of at least partially reducing the Group VI metal of the hetropoly acid;
   (d) drying said treated support at a temperature from about 20° C. to about 200° C. and at about atmospheric pressure; and
   (e) sulfiding said dried treated support, thereby forming the catalyst.

16. The method of claim 15 wherein the reducing agent is selected from the group consisting of sulfur dioxide, hydrogen sulfide, hydrazine, sucrose, dextrose, stannous chloride, and hydroquinone.

17. The method of claim 16 wherein the reducing agent is selected from hydrazine and hydroquinone.

18. The method of claim 16 wherein the Group VIII metal is selected from Co and Ni and a mixture thereof, and the Group VI metal is selected from Mo and W.

19. The method of claim 18 wherein the acid comprising the salt of the Group VIII metal is selected from the group consisting of acetates, formates, citrates, oxides, hydroxides, and carbonates, and the heteropolyacid is selected from phosphomolybdic acid, phosphotungstic acid, silicomolybdic acid, and silicotungstic acid.

20. The method of claim 19 wherein the salt of the Group VIII metal is a citrate, and the heteropolyacid is selected from phosphomolybdic acid, phosphotungstic acid, silicomolybdic acid, and silicotungstic acid.

21. The method of claim 20 wherein the inorganic oxide support is selected from alumina, silica, and co-gelled alumina-silica.

22. The method of claim 21 wherein about 4 to 12 wt. % Group VIII metal and from about 10 to 40 wt. % Group VI metal are used based on the support.

23. The method of claim 22 wherein prior to impregnation the inorganic oxide support is modified with silica.

24. The method of claim 23 wherein the silica source is tetraethylorthosilicate.

25. The method of claim 17 wherein the Group VIII metal is selected from Co and Ni and a mixture thereof, the Group VI metal is selected from Mo and W; the salt of the Group VIII metal is selected from the group consisting of acetates, formates, citrates, oxides, hydroxides, and carbonates; and the heteropolyacid is selected from phosphomolybdic acid, phosphotungstic acid, silicomolybdic acid, and silicotungstic acid.

26. The method of claim 25 wherein the salt of the Group VIII metal is a citrate and the heteropolyacid is phosphomolybdic acid.

27. The method of claim 26 wherein prior to impregnation the inorganic oxide support is modified with silica.

28. The method of claim 27 wherein the silica source is tetraethylorthosilicate.

* * * * *